United States Patent [19]

Bresson

[11] 4,196,115

[45] Apr. 1, 1980

[54] BLENDS OF DIFFERENT CONJUGATED DIENE/MONOVINYL AROMATIC COPOLYMERS IN BITUMINOUS BASED ROOFING AND WATERPROOFING MEMBRANES

[75] Inventor: Clarence R. Bresson, Bartlesville, Okla.

[73] Assignee: Phillips Petroleum Company, Bartlesville, Okla.

[21] Appl. No.: 942,215

[22] Filed: Sep. 14, 1978

[51] Int. Cl.$^2$ .............................................. C08L 95/00
[52] U.S. Cl. ................................................ 260/28.5 B
[58] Field of Search ..................................... 260/28.5 B

[56] References Cited

U.S. PATENT DOCUMENTS

| | | | |
|---|---|---|---|
| 3,225,122 | 12/1965 | Stumpe | 260/894 |
| 3,265,765 | 8/1966 | Halden et al. | 260/876 |
| 3,345,316 | 10/1967 | Nielsen | 260/28.5 |
| 3,639,521 | 2/1972 | Hsieh | 260/880 |
| 3,737,482 | 6/1973 | Kelly et al. | 260/876 B |
| 3,741,856 | 6/1973 | Hurst | 161/88 |
| 3,779,964 | 12/1973 | Gogle | 260/28.5 AS |
| 3,856,732 | 12/1974 | Bresson et al. | 260/28.5 AS |
| 3,926,884 | 12/1975 | McColgon | 260/28.5 B X |
| 3,931,439 | 1/1976 | Bresson et al. | 428/265 |
| 3,978,014 | 8/1976 | van Beem et al. | 260/28.5 AS |
| 4,000,140 | 12/1976 | Tierney | 260/28.5 B X |
| 4,032,491 | 6/1977 | Schoenke | 260/28.5 AS |
| 4,115,335 | 9/1978 | Reusser et al. | 260/28.5 B X |

FOREIGN PATENT DOCUMENTS 652080 11/1962 Canada.
888624 1/1962 United Kingdom.

*Primary Examiner*—Sandra M. Person

[57] ABSTRACT

A radial conjugated diene/monovinyl aromatic copolymer having a weight average molecular weight ($M_w$) above 200,000 and a conjugated diene/monovinyl aromatic ratio of 50/50 to 85/15 is used together with a conjugated diene/monovinyl aromatic copolymer having an $M_w$ below 200,000 and being radial or linear, with same conjugated diene/monovinyl aromatic weight ratios as earlier given, in an asphalt-containing composition to yield desirable high as well as low temperature properties.

11 Claims, No Drawings ns
BLENDS OF DIFFERENT CONJUGATED DIENE/MONOVINYL AROMATIC COPOLYMERS IN BITUMINOUS BASED ROOFING AND WATERPROOFING MEMBRANES

This invention relates to synthetic rubber or copolymer containing bituminous based roofing and waterproofing membranes. In one of its aspects the invention relates to the blending together in an asphalt-based composition at least 2 different copolymers derived from a conjugated diene and a monovinyl aromatic.

In one of its concepts the invention provides a bituminous- or asphalt-based roofing or waterproofing composition having both high and low temperature desirable properties, the composition having as its essential copolymer ingredient at least one radial (branched) conjugated diene/monovinyl aromatic copolymer having a weight average molecular weight ($M_w$) above 200,000 and a conjugated diene/monovinyl aromatic ratio of 50/50 to 85/15 and at least another or second type conjugated diene/monovinyl aromatic copolymer having an $M_w$ below 200,000 and being one of radial and linear, having weight ratios as earlier given. In another of its concepts the invention provides a composition comprising a bituminous material or asphalt, as further characterized herein, in composition with the said essential components. In a still further concept of the invention the essential components are selected to be possessed of properties or parameters given herein.

Bituminous compositions consisting of a bituminous (asphalt) component and a polymer have been described in the literature for various applications such as joint fillers, adhesives, protective layers, impregnating agents and roofing materials. Among such disclosures is U.S. Pat. No. 4,032,491 issued June 28, 1977, which describes a roofing composition comprised of 5–40 wt. % bituminous material and a substantially larger amount (60–95 wt. %) of a hydrogenated linear conjugated diene/monovinyl aromatic copolymer that can be modified to yield a membrane suited for the range of temperature generally prevalent in a specific geographical location. Another disclosure such as U.S. Pat. No. 3,978,014 issued Aug. 31, 1976, describes roofing compositions comprised of bituminous material and a mixture of two different copolymers, one of which contributes to high temperature stability and the other contributes to adhesion to old roof surfaces. Still, another disclosure such as U.S. Pat. No. 3,265,765 issued Aug. 9, 1966, describes special type copolymers used in conjunction with bituminous materials to improve high temperature viscosity and low temperature flexibility.

The above and similarly described compositions when used as roofing materials generally provide whatever good performance properties are obtained at the expense of other performance properties which limits their broader application. For example, when a polymer is added to a bituminous (asphalt) material to improve high temperature properties, the low temperature performance are impaired. Likewise, when both high and low temperature properties are satisfied, the handling characteristics like viscosity are such as to render the system inoperable with standard application equipment. Also, an asphalt-polymer composition can possess most of the desired performance properties but still be impractical because it employs large amounts of an expensive ingredient, namely the polymer.

Needed is an asphalt-polymer composition that can be easily applied with the use of standard asphalt application equipment and that exhibits both good high and low temperature flow properties so that the composition can be used in any geographical location under the prevailing environmental conditions without additions or modifications of the composition to adjust for conditions.

It is an object of this invention to produce a composition suited for roofing use or as waterproofing membrane. It is another object of the invention to set forth an asphalt-based composition comprising synthetic copolymers so selected that the final composition will have both high and low temperature properties satisfying tests which determine said properties for ultimate use. It is a further object of the invention to provide an asphalt-polymer composition which, while possessing all of the desired performance properties for such a composition in use as a roofing and/or a waterproofing membrane, will not need to employ large amounts of expensive ingredient, i.e., the synthetic copolymer, can be easily applied with standard asphalt application equipment but nevertheless exhibits the said properties including importantly both good high and low temperature flow properties so that the composition can be used under the prevailing environmental conditions in any geographical location.

Other aspects, concepts and objects, as well as the several advantages of the invention, are apparent from a study of this disclosure and the appended claims.

According to the present invention there is provided a composition suitable for use as a roofing and/or as a waterproofing membrane having both high and low temperature desirable properties which comprises a. A first radial conjugated diene/monovinyl aromatic copolymer having a weight average molecular weight ($M_w$) above 200,000 and a monomer ratio of from about 50/50 to about 85/15, represented by at least one of the formulas $(A-B)_xY$ and $(A-B-A)_xY$ wherein A represents a non-elastomeric poly(monovinyl aromatic) block, containing 8 to 18 carbon atoms per molecule, and B represents an elastomeric poly(conjugated diene) block, said diene contains 4–12 carbon atoms per molecule, Y is at least one atom derived from a polyfunctional treating agent used in the formation of the radial polymers and x represents the number of functional groups of said polyfunctional treating agent and is an integer equal to at least 3;

b. At least one other or second conjugated diene/monovinyl aromatic copolymer having an $M_w$ below 200,000 and being at least one of radial and linear, when radial formula thereof being as above given in this claim and it having an $M_w$ in the range of 100,000 up to 200,000, and when linear represented by the formula AB wherein A and B are as above given in this claim and having an $M_w$ in the range of from about 75,000 up to about 200,000, preferably now below about 100,000 (see in Table I, LL-1; Solprene TM 1205), the weight ratio of the high and low $M_w$ copolymers being in the range 13/1 to 1/13, and c. An asphalt having a penetration grade below about 300 (ASTM D5).

It can be seen that the invention relates to a bituminous-rubber composition comprised of a high and a lower weight average molecular weight conjugated diene/monovinyl aromatic copolymers blended with an asphalt for use as an impermeable membrane for ponds, roofs, etc. Also, it will have been noted, that as embodied the invention provides an asphalt-rubber composition based on asphalt and a blend of at least 2 different conjugated diene/monovinyl aromatic copolymers which are significantly different in weight average molecular weight.

It is possible within the scope of the invention as here disclosed to effect a method of combining the several copolymers which are described herein, prepared with varying monomer ratios and composited in varying weight ratios of the high $M_w$ and the lower $M_w$ copolymer. Thus, one skilled in the art can determine by routine tests the optimum parameters of those given herein.

Accordingly, the present invention provides a method, based upon the selection of the high $M_w$ copolymer and the lower $M_w$ copolymer, as these are described herein, and the varying of the monomer ratios of each and the weight ratios of each in the composition with a selected asphalt, also as described herein, to produce a water impermeable membrane or roofing which will have the desired properties as tested by tests also described herein.

The success or failure of incorporating combinations of high and lower weight average molecular weight conjugated diene/monovinyl aromatic copolymer in various asphalts to provide simultaneously both the satisfactory high as well as the low temperature performance properties for impermeable membrane-type application cannot always be predicated merely on the basis of the monomer ratio, structure or weight average molecular weight of the copolymers being employed.

It is, of course, to be noted that the most satisfactory compositions are those which possess at the high and low temperatures both the flow and the resistance to cracking properties. For roofing or an application in which the material embodying the composition will lie essentially undisturbed, it ordinarily will suffice to meet the flow test.

Thus, as evidenced by the data herein, which are representative of the research done to arrive at the claimed invention, it was necessary to accomplish considerable experimentation and work to determine that the desired combination of properties, especially the high and low temperature properties, as described and discussed herein, could exist and how these could be obtained.

Conjugated Diene/Monovinyl Aromatic Copolymers

As noted, the conjugated diene/monovinyl aromatic copolymers useful in this invention are of two types.

The first is a radial (branched) conjugated diene/monovinyl aromatic copolymer having a weight average molecular weight ($M_w$) above 200,000 and a conjugated diene/monovinyl aromatic ratio of broadly 50/50 to 85/15 and preferably 55/45 to 80/20. This type polymer is represented by the formula $(A-B)_xY$ or $(A-B-A)_xY$ wherein A represents a non-elastomeric poly(monovinyl aromatic) block or segment containing 8 to 18 carbon atoms per molecule and B represents an elastomeric poly(conjugated diene) block or segment, said diene contains 4 to 12 carbon atoms per molecule, Y is an atom or group of atoms derived from a polyfunctional treating agent used in the formation of the radial polymers and x represents the number of functional groups of said polyfunctional treating agents and is an integer equal to at least 3. The preparation of these polymers is fully described in U.S. Pat. No. 3,639,521 issued Feb. 1, 1972.

The second type conjugated diene/monvinyl aromatic copolymer useful in this invention has a weight average molecular weight ($M_w$) below 200,000 and can be either radial (branched) or linear with the same conjugated diene/monovinyl aromatic weight ratios as previously described. When the copolymer is radial, the $M_w$ is from 100,000 up to 200,000. The formula and preparation of this radial type polymer is also disclosed in U.S. Pat. No. 3,639,521, above mentioned. When the copolymer is linear, the $M_w$ can be between 100,000 to 200,000 but preferably will be below 100,000. These copolymers are represented by the formula, AB wherein A and B are the same as above. The preparation of this copolymer is described in Canadian Pat. No. 652,080 granted Nov. 13, 1962, and British Pat. No. 888,624 granted Jan. 31, 1962. The disclosures of the patents mentioned are incorporated herein by reference.

The $M_w$'s given herein are not absolute values because the Gel Permeation Chromotography analytical method of determining these values has only about a plus or minus 10% accuracy. However, plus or minus 5% accuracy is sometimes obtained.

The ratio of the high $M_w$ copolymer to the lower $M_w$ copolymer is important in this invention because the respective proportion of each contributes in the setting of the final composition to the performance of the asphalt-rubber composition. It now appears that the high $M_w$ copolymer contributes to the high temperature stability, e.g., low or no flow between 25°–100° C. and that the low $M_w$ copolymer contributes to low temperature flexibility, e.g., no cracking at −25° C.

The useful weight ratios of the high $M_w$ copolymer/lower $M_w$ copolymer which are used as a blend or mixture in the present invention are broadly stated in the approximate estimated range 13/1 to 1/13, but preferably will be in the approximate range 6/1 to 1/6, still more preferably will be in the range 2/1 to 1/6.

Copolymers illustrating the operability of the present invention are listed in Table I along with the corresponding properties.

To distinguish the various type copolymers, a special nomenclature is used herein. For example, HR refers to high $M_w$ radial type copolymer, LR refers to low $M_w$ radial type copolymer and LL refers to lower $M_w$ linear type copolymer. All of the polymers listed generally possess about 10% vinyl unsaturation.

TABLE I

| | | BD/STY COPOLYMERS EMPLOYED | | |
|---|---|---|---|---|
| Polymer Designation | Block Polymer Type | Weight Average Molecular Weight, $M_w$ | Wt. % Bd/Wt. % Sty[c] | Tradename |
| A. High $M_w$ Copolymer (>200,000) | | | | |
| HR-1 | Radial | 300,000 | 60/40 | Solprene 406 |
| HR-2[a] | Radial | 240,000 | 60/40 | Solprene 475[a] |
| HR-3 | Radial | 300,000 | 70/30 | Solprene 411 |
| HR-4[a] | Radial | 300,000 | 70/30 | Solprene 480 |
| HR-5 | Radial | 320,000 | 85/15 | Solprene 418 |

TABLE I-continued

BD/STY COPOLYMERS EMPLOYED

| Polymer Designation | Block Polymer Type | Weight Average Molecular Weight, $M_w$ | Wt. % Bd/Wt. % Sty[c] | Tradename |
|---|---|---|---|---|
| B. Low $M_w$ Copolymer (<200,000) | | | | |
| LR-1 | Radial | 130,000 | 60/40 | Solprene 414 |
| LR-2 | Radial | 150,000 | 70/30 | Solprene 416 |
| LR-3 | Radial | 190,000 | 80/20 | Solprene 417 |
| LL-1 | Linear | 87,000 | 75/25 | Solprene 1205 |

[a] Contains 50 phr (parts per hundred resin) naphthenic oil
[b] Conjugated diene is isoprene rather than butadiene
[c] Bd = 1,3-butadiene, Sty = styrene. The ratios of Bd to Sty hereafter described are based on wt. % but the wt. % is dropped for convenience.

Bituminous Material

The bituminous material employed in this invention include any petroleum derived products such as those referred to as asphalts, Gilsonite, air-blown asphalts and other similar type materials. The asphalts can be characterized by having penetration grades below about 300 as measured by ASTM Method D5. It is worthwhile to note that the harder the asphalt, the more copolymer (rubber) may be needed to provide a product within the specification limits herein described.

Fillers, Antioxidants, etc.

Fillers such as silicates, carbonates, etc. plus special additives such as antioxidants can be used with the present invention providing, of course, that the properties of the final composition are within the specification limits as herein described. Mineral aggregates such as sand, chat, pebbles or rock are within the scope of this invention.

Extender Oils

Extender oils are not normally employed in the current invention. However, when the conjugated diene/monovinyl aromatic ratio is below about 65/35 (e.g., 60/40, refer HR-2, Table I) oils are sometimes needed to allow the composition to possess properties within the specifications of the invention. Any type extender oil can be used, such as naphthenic-, paraffinic- and aromatic-based. The naphthenic and aromatic oils are preferred.

General Formulation

A general formulation, listed below, shows the weight range of the ingredients used in the asphalt-rubber composition.

| Ingredients | Operating Range Parts Per Hundred Asphalt | Wt. % |
|---|---|---|
| Asphalt | 100 | 55-97 |
| Copolymer Blend | 3-25 | 1.6-20 |
| a. High $M_w$ Copolymer | 0.2-24.8 | 1.4-18.5 |
| b. Low $M_w$ Copolymer | 0.2-24.8 | 1.4-18.6 |
| Extender Oil | 0-25 | 0-20 |
| Fillers, antioxidants, etc. | 0-55 | 0-30 |

Mixing and Blending

High shear mixers are the preferred equipment used to prepare the asphalt-rubber compositions of the present invention. However, the proper choice or selection of adequate mixing or blending equipment is left to the formulator.

Rubber-Asphalt Specifications and Test Methods

By the proper selection of asphalt and rubber the specifications, which are listed below, can be met. These specifications govern the limits and type of ingredients which are in the present invention. These specifications are specifically for roofing type applications and compositions possessing these properties will be considered satisfactory.

A. Dissolution Time

The nominal total mix charged to a 4 liter beaker was 2200 grams. The asphalt was heated to about 149° C. and a Barinco Converti-jet mixer started with a setting at about 50-70 and rubber introduced as rapidly as it could be drawn into the mix; about 5 min. for pellets and 10-15 min. for crumb or ground rubber. A portion of the asphalt-rubber hot mix was removed and spread by means of a spatula on a paper towel. The rubber was considered completely dissolved when no lumps appeared in the spread asphalt-rubber composition.

B. Viscosity

Broadly the viscosity of the asphalt-rubber composition at 180° C. should be about 500 to about 5,000 cps and preferably between 1,000 to 1,500 cps. Under these conditions, the composition should be capable of easy application with standard asphalt application equipment. Viscosity is determined as follows: An eight gram charge of rubberized-asphalt was added to a stainless steel thimble (20 milliliter capacity) and heated in a Thermocell for 20 minutes by a Proportional Temperature Controller Model 63A while a No. 21 spindle was completely immersed into the rubberized asphalt melt. The resistance at 180° C. to flow was measured by a Brookfield Syncro-lectric Viscometer Model RVT-E at an rpm which would give a midscale reading. The readings were converted to viscosity using the appropriate factor of the rpm.

C. Flow Test

In the hot sun, roofing membranes can slip on an inclined roof if the asphalt is temperature sensitive. One method of measuring this sensitivity is by measuring the flow at elevated temperatures. Flow test was determined in accordance with ASTM D-1191 wherein test specimens are prepared by pouring a hot asphalt-rubber composition into a 60 mm×40 mm×4 mm mold that was placed on a clean flat metal plate slightly wider and about 200 mm longer than the mold. After cooling to about 25° C., the mold frame was removed and the amount of asphalt-rubber movement or flow recorded in mm when the test specimen and plate are inclined at a 75 degree angle at 70° C. or a 45 degree angle at 100°

C. for 150 mins. Asphalt-rubber compositions exhibiting flows of <10 mm at 70° C. and <50 mm at 100° C. were considered satisfactory. The lower temperature tests will usually be passed by a composition suitable for roofing and like applications. The higher temperature test is more of an approximate test; some variation above 50 mm can be tolerated. No flow at either temprature was considered excellent.

D. Mandrel Test at −25° C.

The mandrel bend test involves bending a strip over a mandrel at the test temperature (e.g., −25° C.) to give a measure of flexibility and somewhat simulate whether or not the rollroofing can be handled at low temperatures without cracking. The procedure employed was similar to ASTM D-1737 with the exception that the specimens were not coated on a metal plate. The specimens were prepared by pouring a 75 mm×100 mm sheet in a mold. Prior to conditioning the sheet was cooled in an ice-water bath and three specimens cut with scissors to 100 mm×25 mm×4 mm. The specimens were conditioned in a deep freeze at the described temperature for 16 hours along with the mandrels. The specimens were held with leather gloves by the ends and bent over the mandrel through 180 degrees in one second and observed for cracks or breaks. If the specimen passed the 25 mm mandrel test then another specimen was similarly tested on the 6 mm mandrel. Satisfactory compositions were those that did not break or crack over a 25 mm or 6 mm mandrel at −25° C.

One skilled in the art having studied this disclosure will recognize that the flow tests are paramount for roofing, whereas for bending applications the mandrel tests will be of first importance. The following examples serve to illustrate the operability of the present invention.

EXAMPLE I

Several asphalt-rubber compositions were prepared wherein only one rubbery copolymer was blended into an asphalt at the 14 wt. % copolymer level and evaluated. The results of this evaluation are shown in Table II and indicate that regardless of whether the copolymer blended in the asphalt is a radial (branched) teleblock of high or low $M_w$ (e.g., HR and LR) or a linear block (e.g., LR) all of the properties considered essential for a satisfactory roofing membrane are not simultaneously met. The results do not change even when the 1,3-butadiene (Bd)/styrene (Sty), ratio is varied. When the $M_w$ is below 200,000 (e.g., LR and LL), the flow at elevated temperatures is too high and the low temperature properties are not always good. When the $M_w$ is above 200,000 (e.g., HR series), the flow at elevated temperature is generally good (except HR-5). However, when the low temperature properties are good (HR-3), the viscosity is too high; when the vicosity is good (HR-1), the low temperature properties are poor (HR-1). In addition, the time to dissolve the copolymer in asphalt is high. In other words, each composition lacks something essential to make it a satisfactory composition for a roofing membrane.

In the tables "F" stands for "failed" and "P" stands for "passed".

Table II

| Polymer | | | Performance Properties, 14 Wt. % Polymer in Asphalt [a,b] | | | | | | |
|---|---|---|---|---|---|---|---|---|---|
| | | | Viscosity, cps at | | Flow at | | Mandrel Bend at −25° C. | | Dissolving |
| Designation | Bd/Sty | $M_w$ | 180° C. | 200° C. | 75° C./75< mm | 100° C./45< mm | 25 mm | 6 mm | Time, mins. |
| HR-1 | 60/40 | 300,000 | 1850 | 565 | 0 | 12 | F | — | 137 |
| HR-3 | 70/30 | 300,000 | — | 6300 | 0 | 2 | P | P | 75 |
| HR-5 | 85/15[c] | 320,000 | 1475 | 750 | 4 | 200+ | P | P | 35 |
| LR-1 | 60/40 | 130,000 | 975 | 483 | 0 | 101 | F | — | 15 |
| LR-2 | 70/30 | 150,000 | 1375 | 725 | 3 | 200+ | — | — | 40 |
| LR-3 | 80/20 | 190,000 | 3350 | 1625 | 9 | 200+ | P | P | 40 |
| LL-1 | 75/25 | 87,000 | 540 | 315 | 200+ | — | F | — | 40 |

[a] 120-150 Penetration asphalt from Sun Ray.
[b] Formulation with HR-1 contained only 10 wt. % copolymer because of difficulty in dissolving.
[c] Conjugated diene is isoprene.

EXAMPLE II

Combining some high $M_w$ copolymers with some lower $M_w$ copolymers can give asphalt-rubber compositions that satisfy the performance requirements for roofing membrane materials. For example, Runs 7, 8, 10, 11 in Table III are compositions with good all-around performance. These runs are comprised of a high $M_w$ copolymer with a 70/30 Bd/Sty ratio combined with a lower $M_w$ copolymer with a 70/30 Bd/Sty ratio radial polymer with a 75/25 Bd/Sty ratio linear polymer. Employing a lower $M_w$ copolymer with a 60/40 Bd/Sty ratio can sometimes be marginal as shown in Runs 5 and 6 since not all properties are satisfied, 6 mm mandrel bend in Run 6 and 100° C. flow in Run 5. The data also shows that not all high $M_w$ copolymer-lower $M_w$ copolymer blends (Runs 1-4 and 12-14) give satisfactory performance. Thus, it becomes apparent that the performance properties of a particular asphalt-rubber composition can not be predicted entirely on the physical properties of the copolymers employed. The data seems to indicate the high $M_w$ copolymer portion of the final composition is restricted to a 70 Bd/30 Sty copolymer, although there are exceptions as shown in Table IV.

Runs in the following tables which are asterisked are considered to be within the scope of this invention. It will be understood that while the actual data given were obtained experimentally, they can, at least in some instances, be viewed in light of the sum total experience of one who has done the considerable work and experimentation reflected herein.

Table III

| | High $M_w$ Polymer | | | Low $M_w$ Polymer | | | Performance Properties in Asphalt | | | | | |
|---|---|---|---|---|---|---|---|---|---|---|---|---|
| | | | | | | | Viscosity cps at | | Flow at | | Mandrel Bend at −25° C. | |
| | | | | | | | | | 70° C./ 75 < | 100° C./ 45 < | 25 | 6 |
| Run No. | Wt. % | Desig-nation | Bd/Sty | Wt. % | Desig-nation | Bd/Sty | 180° C. | 200° C. | mm | mm | mm | mm |
| 1.* | 7.0 | HR-1 | 60/40 | 7.0 | LR-1 | 60/40 | 2425 | 1150 | 0 | 4 | F | — |
| 2* | 4.7 | HR-1 | 60/40 | 9.3 | LR-2 | 70/30 | 3200 | 1425 | 0 | 12 | F | — |
| 3 | 4.7 | HR-1 | 60/40 | 9.3 | LR-3 | 80/20 | too viscous to completely dissolve | | | | | |
| 4* | 4.7 | HR-1 | 60/40 | 9.3 | LL-1 | 75/25 | 2125 | 875 | 0 | 9 | F | — |
| 5* | 4.7 | HR-3 | 70/30 | 9.3 | LR-1 | 60/40 | 2300 | 1150 | 0 | 58 | P | P |
| 6* | 7.0 | HR-3 | 70/30 | 7.0 | LR-1 | 60/40 | 2500 | 1486 | 0 | 23 | P | F |
| 7* | 4.7 | HR-3 | 70/30 | 9.3 | LR-2 | 70/30 | 3000 | 1650 | 0 | 14 | P | P |
| 8* | 7.0 | HR-3 | 70/30 | 7.0 | LR-2 | 70/30 | 4400 | 2530 | 0 | 16 | P | P |
| 9* | 7.0 | HR-3 | 70/30 | 7.0 | LR-3 | 80/20 | 3700 | 2800 | 0 | 22 | F | — |
| 10* | 4.7 | HR-3 | 70/30 | 9.3 | LL-1 | 75/25 | 4100 | 1350 | 2 | 5 | P | P |
| 11* | 9.3 | HR-3 | 70/30 | 4.7 | LL-1 | 75/25 | 5450 | 3900 | 0 | 9 | P | P |
| 12 | 7.0 | HR-5 | 85/15$^a$ | 7.0 | LR-1 | 60/40 | | | b | | | |
| 13 | 7.0 | HR-5 | 85/15$^a$ | 7.0 | LR-2 | 70/30 | | | b | | | |
| 14* | 7.0 | HR-5 | 85/15$^a$ | 7.0 | LR-3 | 80/20 | 2300 | 1150 | 10 | 200+ | P | P |

$^a$Conjugated diene is isoprene
$^b$Did not determine because flow properties of both copolymers individually in asphalt were poor

EXAMPLE III

Some high $M_w$ copolymers blended in asphalt by themselves (Runs 1 and 3) or in combination with a lower $M_w$ copolymer (Run 2) still do not result in compositions with satisfactory all-around properties. However when a small amount of extender oil is added to the system, good properties are obtained. Extender oil is particularly useful when the Bd/Sty ratio is around 60/40 (Runs 3 and 6). With a 60/40 Bd/Sty copolymer (Run 3) the use of a lower $M_w$ copolymer does not appear necessary to provide a satisfactory composition. Nevertheless, high $M_w$ copolymers with extender oil and blended with lower $M_w$ copolymers make a good system with excellent all-around properties. The presence of extender oil should help reduce the time required to dissolve the high $M_w$ copolymer in asphalt, see Table IV for data.

EXAMPLE IV

The data in Table V shows that with a 70/30 Bd/Sty high $M_w$ radial teleblock copolymer a 75 Bd/25 Sty low $M_w$ linear block copolymer can be employed over a wide ratio between the two copolymers to give good all-around properties (Runs 6, 7, 8). Decreasing the ratio of high $M_w$ copolymer to low $M_w$ copolymer to 1:13 has a deleterious effect on properties such as flow at 100° C. and mandrel bend (Run 5). With the same high $M_w$ radial copolymer, a lower $M_w$ radial copolymer can be employed at a ratio of 1 part high $M_w$ copolymer to 2 parts lower $M_w$ copolymer. The data also shows that a rubber level of 14 wt. % is better than a rubber level of only 9.8% in providing good all-around properties when a 50:50 blend of high and lower $M_w$ copolymers are used (Run 1 Table V).

Table IV

| | High $M_w$ Polymer | | | Low $M_w$ Polymer | | | Performance Properties in Asphalt | | | | | |
|---|---|---|---|---|---|---|---|---|---|---|---|---|
| | | | | | | | Viscosity, cps at | | Flow at | | Mandrel Bend at −25° C. | |
| | | | | | | | 180° | 200° | 7° C./ 75 < | 100° C./ 45 < | 25 | 6 |
| Run No. | Wt. % | Desig-nation | Bd/Sty | Wt. % | Desig-nation | Bd/Sty | C. | C. | mm | mm | mm | mm |
| 1 | 14.0 | HR-1 | 60/40 | — | — | — | 1850$^a$ | 565$^a$ | 0$^a$ | 12$^a$ | F$^a$ | — |
| 2* | 7.0 | HR-1 | 60/40 | 7.0 | LR-1 | 60/40 | 2425 | 1150 | 0 | 4 | P | — |
| 3 | 14.0$^b$ | HR-2 | 60/40 | — | — | 1375 | 1000 | 0 | 1 | P | P | |
| 4* | 7.0$^b$ | HR-2 | 60/40 | 7.0 | LR-1 | 60/40 | 1575 | 780 | 0 | 35 | P | P |
| 5 | 14.0 | HR-3 | 70/30 | — | — | — | — | 6300 | 0 | 2 P | P | |
| 6 | 14.0$^b$ | HR-4 | 70/30 | — | — | — | 8900 | 4200 | 0 | 3 | P | P |
| 7* | 47 | HR-3 | 70/30 | 9.3 | LR-3 | 70/30 | 3000 | 1650 | 0 | 14 | P | P |
| 8* | 4.7$^b$ | HR-4 | 70/30 | 9.3 | LR-3 | 70/30 | 3025 | 1575 | 0 | 60 | P | P |

$^a$Contains only 10 wt. % copolymer because of difficulty in dissolving.
$^b$Value shown expressed on dry wt. basis. Copolymer is supplied containing 50 phr naphthenic oil.

Table V

| | High $M_w$ Polymer | | | Low $M_w$ Polymer | | | Performance Properties | | | | | |
|---|---|---|---|---|---|---|---|---|---|---|---|---|
| | | | | | | | Viscosity cps at | | Flow at | | Mandrel Bend at −25° C. | |
| | | | | | | | 180° | 200° | 70° C./ 75 < | 100° C./ 45 < | 25 | 6 |
| Run No. | Wt. % | Desig-nation | Bd/Sty | Wt. % | Desig-nation | Bd/Sty | C. | C. | mm | mm | mm | mm |
| 1* | 4.9 | HR-3 | 70/30 | 4.9 | LR-2 | 70/30 | 948 | 610 | 2 | 114 | F | — |
| 2* | 7.0 | HR-3 | 70/30 | 7.0 | LR-2 | 70/30 | 4400 | 2530 | 0 | 16 | P | P |
| 3* | 2.0 | HR-3 | 70/30 | 12.0 | LR-2 | 70/30 | 2450 | 1400 | 0 | 153 | P | P |
| 4* | 4.7 | HR-3 | 70/30 | 9.3 | LR-2 | 70/30 | 3000 | 1650 | 0 | 14 | P | P |
| 5 | 1.0 | HR-3 | 70/30 | 13.0 | LL-1 | 75/25 | 1425 | 835 | 2 | 200+ | F | — |

Table V-continued

| | High $M_w$ Polymer | | | Low $M_w$ Polymer | | | Performance Properties | | | | | |
|---|---|---|---|---|---|---|---|---|---|---|---|---|
| | | | | | | | Viscosity cps at | | Flow at | | Mandrel Bend at −25° C. | |
| Run No. | Wt. % | Designation | Bd/Sty | Wt. % | Designation | Bd/Sty | 180° C. | 200° C. | 70° C./ 75 < mm | 100° C./ 45 < mm | 25 mm | 6 mm |
| 6* | 2.0 | HR-3 | 70/30 | 12.0 | LL-1 | 75/25 | 1650 | 950 | 0 | 48 | P | P |
| 7* | 4.7 | HR-3 | 70/30 | 9.3 | LL-1 | 75/25 | 4100 | 1350 | 2 | 5 | P | P |
| 8* | 9.3 | HR-3 | 70/30 | 4.7 | LL-1 | 75/25 | 5450 | 3900 | 0 | 9 | P | P |

EXAMPLE V

The data in Table VI shows the results obtained when three copolymers are blended at a 14 wt. % total rubber in asphalt. Generally, viscosity is the one property that is enhanced with little sacrifice of the other properties. The technique can be particularly useful in maintaining good properties when copolymers of higher than usual sytrene content (e.g., 50–60 wt. %) are employed. Ternary systems of all lower $M_w$ copolymers (e.g., $M_w < 200,000$) are generally not satisfactory as they tend to exhibit poor resistance to flow at elevated temperatures (Run 9 Table VI).

Table VI

| Run No. | High M_W Radial Polymer Wt. % | Designation | Bd/Sty | Low M_W Radial Polymer Wt. % | Designation | Bd/Sty | Low M_W Linear Polymer Wt. % | Designation | Bd/Sty | Viscosity, cps at 180° C. | 200° C. | Flow at 70° C./75 mm | 100° C./45 mm | Mandrel Bend at −25° C. 25 mm | 6 mm |
|---|---|---|---|---|---|---|---|---|---|---|---|---|---|---|---|
| 1* | 4.7 | HR-3 | 70/30 | 9.3 | LR-2 | 70/30 | — | — | — | 3000 | 1650 | 0 | 14 | P | P |
| 2* | 4.7 | HR-3 | 70/30 | — | — | — | 9.3 | LL-1 | 75/25 | 4100 | 1350 | 2 | 5 | P | P |
| 3* | 4.7 | HR-3 | 70/30 | 4.7 | LR-2 | 70/30 | 4.7 | LL-1 | 75/25 | 2625 | 1525 | 0 | 19 | P | P |
| 4* | 9.3 | HR-3 | 70/30 | 2.3 | LR-2 | 70/30 | 2.3 | LL-1 | 75/25 | 7600 | 2875 | 0 | 7 | F | — |
| 5* | 4.7[a] | HR-2 | 60/40 | 9.3 | LR-1 | 60/40 | — | — | — | 1325 | 650 | 0 | 21 | P | P |
| 6* | 4.7[a] | HR-2 | 60/40 | — | — | — | 9.3 | LL-1 | 75/25 | 1470 | 788 | 0 | 48 | F | — |
| 7* | 4.7[a] | HR-2 | 60/40 | 4.7 | LR-1 | 60/40 | 4.7 | LL-1 | 75/25 | 1800 | 845 | 1 | 41 | P | P |
| 8* | 4.7 | LR-1 | 60/40 | 4.7 | LR-3 | 80/20 | 4.7 | LL-1 | 75/25 | 1525 | 840 | 2 | 200+ | P | P |

[a]Dry weight basis. Copolymer as received contains 50 phr naphthenic oil.

SUMMARY AND DISCUSSION OF DATA

The data which herein describes asphalt-rubber compositions especially useful as roofing membrane materials can be summarized as follows:

1. Blends of at least two conjugated diene/monovinyl aromatic copolymers wherein one rubber is a radial (branched) block copolymer with a $M_w$ above 200,000 and the other rubber is either a radial or linear block copolymer with a $M_w$ below 200,000 when incorporated in asphalt at about 14 wt. % total rubber gives a product with good all-around performance properties such as no or low flow or cracking under extreme temperature conditions (e.g., 100° C. to −25° C.) and low melt viscosity at 180° C. for easy application in standard asphalt application equipment.

2. Satisfactory performance properties can not be predicted on the basis of the Bd/Sty ratio and $M_w$ of the copolymer employed although indications are that best results are obtained when the high $M_w$ copolymer is based on a 70 wt. % Bd/30 wt. % Sty radial block copolymer and the low $M_w$ copolymer is based on either a 70 wt. % Bd/30 wt. % Sty radial block polymer or a 75 wt. % Bd/25 wt. % Sty linear block copolymer. Copolymers with higher styrene content (e.g., 60 wt. % Bd/40 wt. % Sty) can also be used particularly when an extender oil is used.

3. Combining one high $M_w$ radial copolymer with 2 different lower $M_w$ copolymers (radial and linear) in what is referred to as a ternary system enhances the handling characteristics of the final asphalt-rubber composition.

Reasonable variation and modification are possible within the scope of the foregoing disclosure and the appended claims to the invention the essence of which is that an asphalt-based composition which has been produced using at least one of each of the conjugated diene/monovinyl aromatic copolymers as described herein, has been found to exhibit simultaneously both high and low temperature properties which are highly desirable also as described, and that a method for producing such compositions has been set forth; the whole being based upon representative data which have been incorporated in the foregoing disclosure.

I claim:

1. A composition, suitable for use as a roofing material or as a waterproofing membrane having both high and low temperature desirable properties which comprises
   a. A first radial conjugated diene/monovinyl aromatic copolymer having a wt. average molecular weight ($M_w$) above 200,000 and a monomer ratio of from about 50/50 to about 85/15, represented by at least one of the formulas $(A-B)_xY$ or $(A-B-A)_xY$ wherein A represents an non-elastomeric poly(monovinyl aromatic) block containing 8–18 carbon atoms per unit of the block and B represents an elastomeric poly(conjugated diene) block, said diene contains 4 to 12 carbon atoms per unit of the block, Y is at least one atom derived from a polyfunctional treating agent used in the formation of the radial polymers and x represents the number of functional groups of said polyfunctional treating agent and is an integer equal to at least 3;
   b. A second conjugated diene monovinyl aromatic copolymer having an $M_w$ below 200,000 and being at least one of radial and linear, when radial the formula thereof being as above given in this claim and it having an $M_w$ in the range from 100,000 up to 200,000, and when linear represented by the formula AB, wherein A and B are as above given in this claim and having an $M_w$ in the range of from about 75,000 up to 200,000, the ratio of the high and low $M_w$ copolymers being in the range 13/1 to 1/13, and
   c. An asphalt having a penetration grade below about 300 (ASTM D5).

2. A composition according to claim 1 wherein the second copolymer when linear has an $M_w$ below 100,000.

3. A composition according to claim 1 wherein the final composition is made up as follows:

| | Operating Range | |
|---|---|---|
| Ingredients | Parts Per Hundred Asphalt | Wt. % |
| Asphalt | 100 | 55–97 |
| Copolymer Blend | 3–25 | 1.6–20 |
| a. High $M_w$ Copolymer | 0.2–24.8 | 1.4–18.5 |
| b. Low $M_w$ Copolymer | 0.2–24.8 | 1.4–18.6 |
| Extender Oil | 0–25 | 0–20 |
| Fillers, antioxidants, etc. | 0–55 | 0–30 |

4. A composition according to claim 2 wherein the final composition is made up as follows:

| | Operating Range | |
|---|---|---|
| Ingredients | Parts Per Hundred Asphalt | Wt. % |
| Asphalt | 100 | 55–97 |
| Copolymer Blend | 3–25 | 1.6–20 |
| a. High $M_w$ Copolymer | 0.2–24.8 | 1.4–18.5 |
| b. Low $M_w$ Copolymer | 0.2–24.8 | 1.4–18.6 |
| Extender Oil | 0–25 | 0–20 |
| Fillers, antioxidants, etc. | 0–55 | 0–30 |

5. A composition according to claim 1 wherein the composition passes the following tests
   a. heat asphalt to about 149° C., charge and mix therewith the remaining ingredients of the composition, introduce the rubber in about 5–15 minutes, the lower end of the time range being applicable for pellets and the upper end for crumb or ground rubber and spreading with a spatula on paper a portion of the hot mix, there should be no lumps in the spread,
   b. a viscosity of the composition at 180° C. in the range from about 500 to about 5,000 cps
   c. flow tests ASTM D-1191—flows of less than 10 mm at 70° C. and less than about 50 mm at 100° C.,
   d. mandrel test ASTM D-1737 but not coated on a plate and conditioning the specimen and mandrel in a deep freeze at −25° C. for 16 hours and bending specimen over the mandrel through a 180 degrees in one second, with no breaking or cracking over a 25 mm and a 6 mm mandrel.

6. A composition according to claim 1 wherein the conjugated diene is 1,3-butadiene and the monovinyl aromatic is styrene.

7. A composition according to claim 1 wherein the ratio of the high $M_w$ copolymer to the lower $M_w$ copolymer is in the range 1/6–6/1.

8. A composition according to claim 1 wherein the ratio of the high $M_w$ copolymer to the lower $M_w$ copolymer is in the range 2/1–1/6.

9. A method for producing a composition suitable for use as a roofing material or as a waterproofing membrane according to claim 1 which comprises admixing the first and second conjugated diene/monovinyl aromatic copolymers of said claim with an asphalt of said claim.

10. A method according to claim 9 wherein the conjugated diene is 1,3-butadiene and the monovinyl aromatic is styrene.

11. A method according to claim 9 wherein the conjugated diene is isoprene and the monovinyl aromatic is styrene.

* * * * *